Patented Jan. 22, 1924.

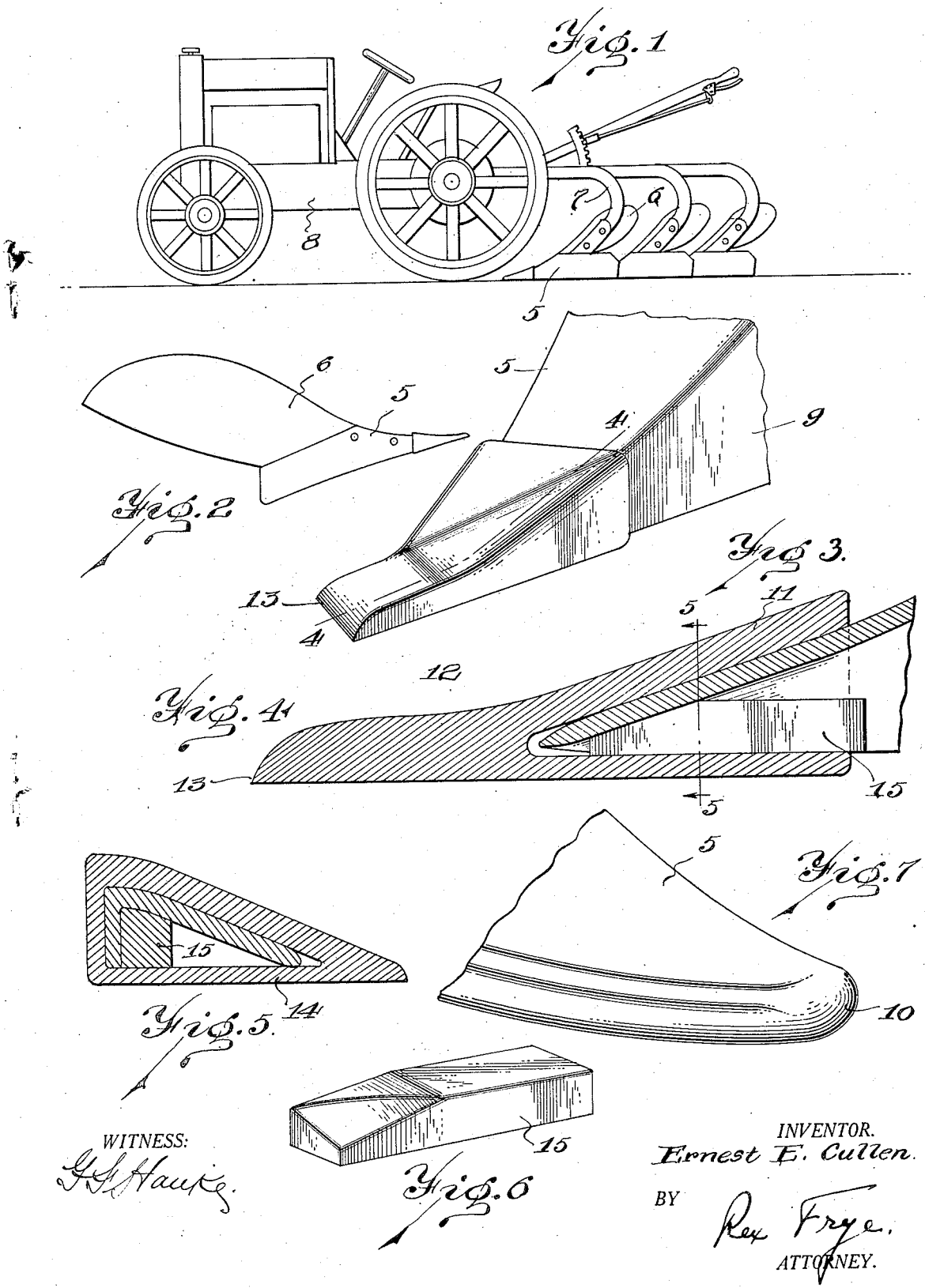

1,481,458

UNITED STATES PATENT OFFICE.

ERNEST E. CULLEN, OF NEW BALTIMORE, MICHIGAN, ASSIGNOR OF ONE-HALF TO CHARLES H. MURDICK, OF NEW BALTIMORE, MICHIGAN.

DETACHABLE PLOWPOINT.

Application filed January 9, 1922. Serial No. 528,067.

*To all whom it may concern:*

Be it known that I, ERNEST E. CULLEN, a citizen of the United States, and residing at New Baltimore, county of Macomb, and State of Michigan, have invented a new and Improved Detachable Plowpoint, of which the following is a specification.

This invention relates to improvements in detachable plow points and while adapted particularly for use with tractor plows, is also useful with the customary hand plows.

It has long been a desideratum of plow manufacturers to produce a plow having a point that will successfully break and turn the soil without being itself rapidly worn away. Despite the adoption of many metallic alloys for use in such point portions of the plows, it still is the fact that a plow point soon becomes worn to a shape that no longer successfully breaks the soil in a straight line, most of them wearing to a shape that lends itself to "billowing," so called because of the undulating motion of the plow point. The primary object of my invention is to provide a separate plow point that can be readily attached over the worn end of the plow to permit the continued use of the plowshare.

A further object of my invention is to provide a detachable plow point having a substantially horizontal edge portion, backed by a solid mass of metal in advance of the body portion of the plow point, which is hollowed and tapered to substantially the shape of a worn point of a plow.

A further object of my invention is to provide a detachable plow point having an edge portion and body portion integrally formed that is simple, efficient, and comparatively inexpensive to produce.

The above and other objects of my invention will be apparent from the following description wherein reference is made to the accompanying drawing illustrating a preferred embodiment of my invention, and wherein similar reference numerals designate similar parts throughout the several views.

In the drawings:—

Fig. 1 is a side elevation of a tractor provided with a gang of plows equipped with my improved detachable plow points;

Fig. 2 is a side elevation of one of the plowshares;

Fig. 3 is a perspective view of the point portion thereof;

Fig. 4 is a longitudinal section taken substantially on the line 4—4 of Fig. 3;

Fig. 5 is a cross section taken substantially on the line 5—5 of Fig. 4;

Fig. 6 is a perspective view of a wedge adapted to be used for securing the detachable plow point in position, and Fig. 7 is a detail view of the worn end of a plowshare.

Referring now to the drawings, the numeral 5 designates a plowshare having the usual moldboard 6 attached and adapted to be secured by means of the beam 7 to a tractor 8 or other draft means. The plowshare is formed with a curved top portion and straight landside 9 in the usual manner, and the point 10 thereof is worn to a rounded shape substantially as shown in Fig. 7 when used for a short period of time without a detachable plow point.

My detachable plow point is provided with a hollowed body portion 11, the aperture of which is shaped to fit snugly over the curved upper portion and straight landside of the plowshare (see Fig. 5), and a point portion 12 consisting of a substantially horizontal sharpened edge 13, reinforced by a backing of solid metal arranged for some considerable distance between the edge and the hollowed body portion. The sharpened edge 13 is thus strengthened to efficiently break the soil while maintaining a straight line as it is pulled along, the bottom of both the point and body portion having a substantially flat surface 14 (see Fig. 5). The upper surface of my detachable plow point is preferably shaped so as to assist in turning the soil, the form herein illustrated being tapered from adjacent the top of the straight landside of the plow point to an edge substantially in alignment with the straight bottom portion.

Any desired means of securing the detachable plow point to the plowshare may be employed. In the illustrated embodiment I have shown a wedge 15, shaped substantially as shown in Fig. 6, which is inserted between the upper surface of the bottom portion of the detachable plow point and the under surface of the plowshare adjacent the landside thereof (see Fig. 5). A few taps with a hammer will serve to wedge the detachable plow point in position upon the point portion of the plowshare, and when it is desired to detach the plow point, it is only necessary to strike the rear edge of the detachable plow point. By thus driving the plow point in a forward direction it will be slid down the inclined upper surface of the plowshare until the wedge 16 is released.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

Having described my invention I claim:—

1. A detachable plow point having a point portion of solid metal and a hollow body portion arranged with a horizontal bottom and a vertical side wall, and means for securing the plow point on the plowshare with the vertical side wall engaging the landside of the plowshare, comprising a wedge adapted to engage the landside of the plowshare and the horizontal bottom wall of the point.

2. A detachable plow point having a point portion of solid metal and a hollow body portion arranged with a horizontal bottom and vertical side walls, and means for securing the plow point on the plowshare with the vertical side wall engaging the landside of the plowshare, comprising a wedge adapted to engage both the inclined upper wall and the landside of the plowshare and the horizontal bottom of the point.

ERNEST E. CULLEN.

Witnesses:
CHARLES H. MURDICK,
REX FRYE.